Figure 1:
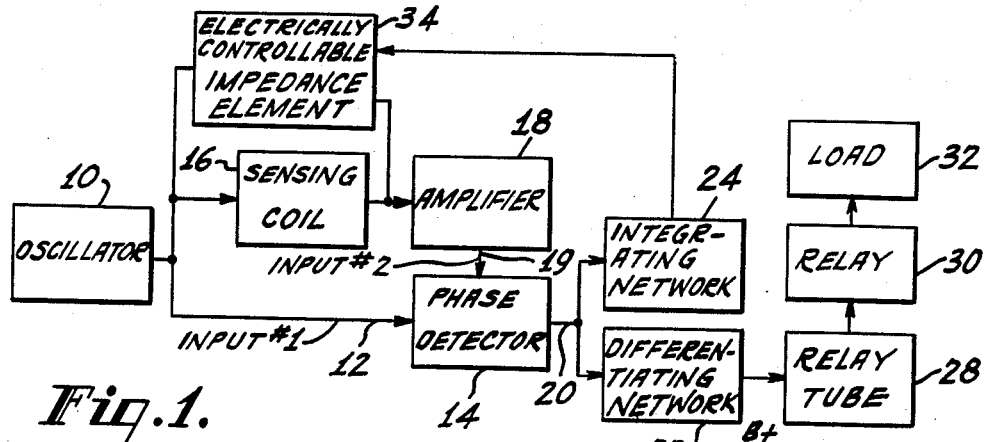

June 28, 1960 G. W. GRAY ET AL 2,943,306
OBJECT DETECTOR
Filed Jan. 12, 1956

INVENTORS
WINTHROP S. PIKE &
GEORGE W. GRAY
BY
ATTORNEY

United States Patent Office 2,943,306
Patented June 28, 1960

2,943,306

OBJECT DETECTOR

George W. Gray, Lambertville, and Winthrop S. Pike, Princeton, N.J., assignors to Radio Corporation of America, a corporation of Delaware Filed Jan. 12, 1956, Ser. No. 558,706

9 Claims. (Cl. 340—258)

The present invention relates to improved systems for detecting objects. While not restricted thereto, the invention is particularly suited for the control of vehicular traffic.

It is a general object of the present invention to provide an improved arangement for detecting the presence of objects.

It is another object of the invention to provide an object detecting system whose operation is not substantially affected by slow changes in system parameters or by changes in ambient operating conditions.

Another object of the invention is to provide an improved arrangement for detecting and counting metal articles, such as ones riding on a conveyor belt, or detecting metal impurities in non-metallic objects such as extraneous metal objects in manufactured cloth as the latter moves past an inspection point during the process of its manufacture.

Another object of the invention is to provide an improved system for counting vehicles as they pass along the road or for actuating signal or warning devices in response to vehicles which pass along the road.

The invention includes an impedance device of the type having an impedance which is a function between limits of the spacing between it and an object. An indicating means is coupled to the device and produces an indication in response to a relatively rapid change in the device's impedance. The invention also includes means coupled to the impedance device and responsive to relatively slow changes in its impedance for compensating for such slow changes.

A specific form of the invention includes a phase-shifting network, the impedance device being one of the phase-shift producing elements of the network. The phase-shift produced by the network is measured by a phase detector which produces a control voltage having a sense and magnitude which are functions of the sense and magnitude of the change in impedance of the impedance device from a quiescent value. The means responsive to relatively rapid changes may include a differentiating circuit connected to receive the output of the phase detector. The means responsive to relatively slow changes may comprise an integrating circuit coupled to an electronically controllable impedance element such as a reactance tube. The integrating circuit is connected to receive the output voltage of the phase detector and the reactance tube is effectively connected in parallel with the impedance device.

When employed in a vehicular traffic control system, the impedance device may consist of a coil of relatively large dimensions buried in the road.

Figure 2:
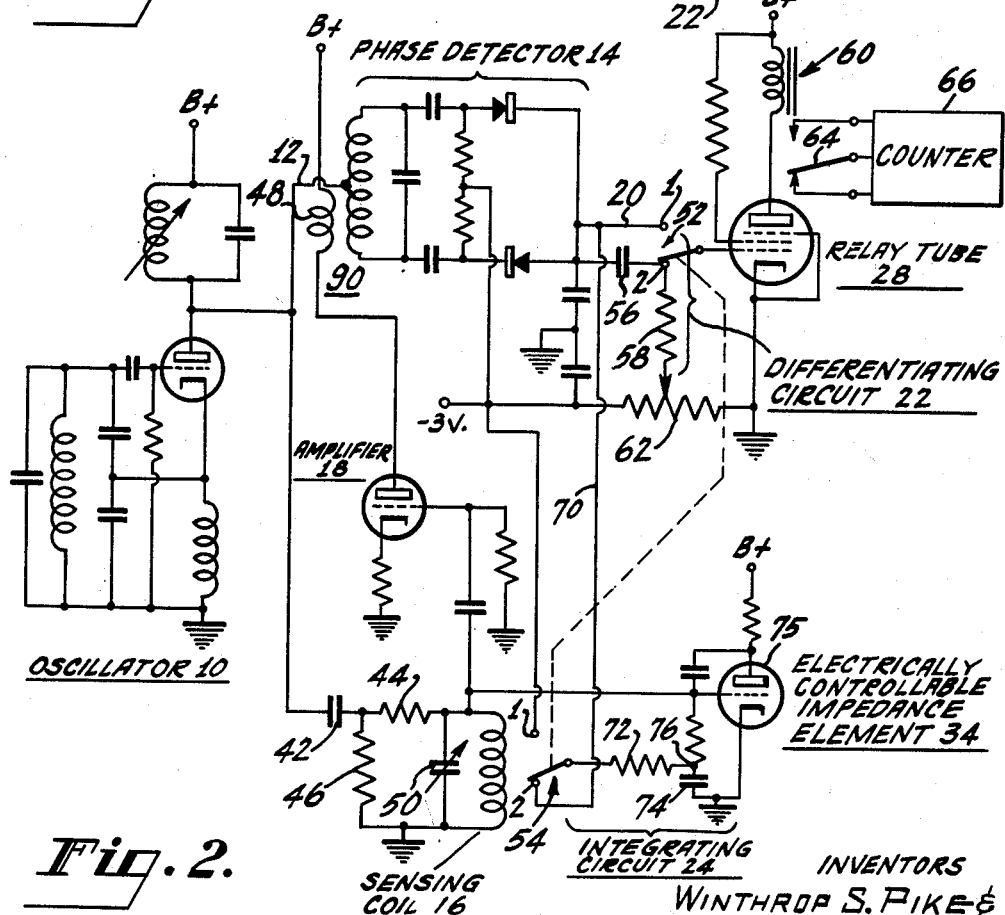

The invention will be described in greater detail by reference to the following description taken in connection with the accompanying drawing in which:

Figure 1 is a block circuit in diagram of a preferred form of the invention; and Figure 2 is a schematic circuit diagram of the preferred form of the invention.

Referring to Figure 1, an oscillator 10 supplies its output to two branches. One is a direct connection to a lead 12 to a phase detector 14, and the other is a phase-shifting network including a sensing coil 16 and an amplifier 18, in series with a lead 19 to the phase detector 14. The phase-shifting network also includes other circuits not shown in Figure 1 but described in detail below. When the system is in balance, the signals on the leads 12 and 19 are substantially in quadrature, and the phase detector output voltage, available at lead 20, is zero volts.

When the system is used as a vehicle detector, the sensing coil may comprise several turns of insulated wire and the coil diameter may be relatively large. For example, an embodiment designed for operation at 300 kilocycles uses a rectangular coil 4 x 18 feet. In this form of the invention, the sensing coil is preferably embedded in the road. When a vehicle passes over the sensing coil, the impedance of the coil changes, whereby the phase-shift introduced by the phase-shifting network also changes. The input signals to the phase-detector are now no longer in quadrature and the phase detector output voltage sharply changes.

In the use described above, changing external conditions may cause slow changes in the sensing coil reactance. This occurs, for example, when it rains or snows. A slow reactance change causes a slow phase change in the signal applied via the lead 19 to the phase detector, and a corresponding slow amplitude change in the phase detector output voltage. If the lead 20 were directly connected to an indicating device, the phase detector output voltage would eventually actuate the latter.

This invention includes means for preventing slow sensing coil impedance changes from affecting the indicating device. A differentiating circuit 22 is connected between the phase detector and indicating means (relay tube 28, relay 30, and load 32), and an integrating network 24 is connected between the phase detector 14 and an electrically controllable impedance element 34 that is connected across the sensing coil 16. The element 34 may be a reactance tube, an electronically controllable inductor or capacitor, or a servo-driven impedance element. When a vehicle passes over the sensing coil 16, the change in phase detector output voltage is rapid and the differentiating network produces an output pulse. The output pulse triggers the relay tube 28 which in turn actuates the relay 30. The relay is connected to a load 32 such as a signal light, counter, warning signal transmitter or other similar arrangement. Slow changes in the phase detector output voltage do not affect the differentiating circuit. The integrating network has a substantially longer time constant than the differentiating circuit, whereby it does not respond to rapid changes in the phase detector output voltage. However, when the change in detector output voltage is relatively slow, it is applied through the integrating network to the electrically controllable impedance element. The impedance element is effectively in shunt with the sensing coil, and changes in the former's reactance compensate for the slow change in the sensing coil reactance.

Referring to Figure 2, the oscillator 10 is of conventional design and need not be described in further detail. Its output signal is applied via the lead 12 to the center tap of a tuned input circuit 90 of the phase detector 14. The oscillator signal is also applied via an isolating and phase-changing network including a condenser 42, and resistors 44 and 46 to the sensing coil 16. The output of the sensing coil is amplified in amplifier 18 and applied via the coil 48 as the second input to the phase detector 14. A variable condenser 50, which is connected across the sensing coil 16, is adjusted to a value such that two signals applied to the phase detector are substantially in quadrature.

The phase detector 14 is similar to detectors employed in television circuits. The two inputs to the phase detector are in push-push. When they are of equal amplitude and in quadrature, the phase detector output voltage at the lead 20 is zero volts. However, when the reactance of the sensing coil changes so that the phase of the second input signal to the phase detector is changed, an output voltage appears at the lead 20. In one form of the invention, this output voltage may be used to trigger an indicating device such as a counter or the like. In this form of the invention, ganged switches 52 and 54 are in position 1.

With switches 52 and 54 thrown to position 2, as shown in Figure 2, the compensating circuits are in their operative positions. The differentiating circuit which includes condenser 56 and resistor 58, serves as the input circuit to relay tube 28. The bias on the relay tube is adjusted to a value such that the plate current through relay 60 is just insufficient to actuate the relay. This adjustment may be made by means of potentiometer 62. When an object such as a vehicle passes over the sensing coil, there is rapid change in the output voltage of the phase detector and a pulse is developed at terminal 2 of switch 52. As the vehicle leaves the sensing coil, there is a rapid change, in the opposite sense, in the phase of the signal applied via coil 48 to the phase detector, and an output pulse in an opposite sense is developed at terminal 2 of switch 52. The first pulse causes relay leaf 64 to move to the up position and the second pulse causes the relay leaf to move to the down position (the one shown in Figure 2). In the embodiment of the invention shown, the relay actuates a counter 66.

When there is slow drift in the impedance of sensing coil 16, there is no change in the voltage at terminal 2 of switch 52, and the relay is not triggered. However, this slow voltage change is applied over lead 70 and terminal 2 of switch 54 to the integrating circuit including resistor 72 and condenser 74. The latter are in the grid-to-cathode circuit of a reactance tube 75. As the value of the control voltage applied over lead 70 changes, the bias voltage applied from terminal 76 of the integrating circuit to the control grid of the reactance tube also changes. This changes the effective gain of the reactance tube and, as is well known, also changes the grid-to-cathode capacitance of the reactance tube. (The latter is a function of the gain of the tube.) The grid-to-cathode circuit of the reactance tube is effectively connected in parallel with sensing coil 16. Changes in the grid-to-cathode capacitance cause changes in the effective impedance presented by the sensing coil. The change in impedance due to the reactance tube, however, is in the correct sense to compensate for the change sensing coil impedance caused, for example, by snow on the road, etc.

In a practical embodiment of the circuit designed for vehicle detection, the oscillator 10 was tuned to 300 kilocycles. The following circuit components were employed:

| | |
|---|---|
| Oscillator 10 | ½ of 12AT7 |
| Relay tube 28 | ½ of 6U8 |
| Resistor 58 | megohms 2.2 |
| Resistor 72 | do 10 |
| Amplifier 18 | other ½ of 12AT7 |
| Reactance tube 34 | other ½ of 6U8 |
| Capacitor 56 | microfarads 1.22 |
| Capacitor 72 | do 10 |

Although the specific embodiment of the invention described is employed as a vehicle detector, it should be appreciated that the present invention has many other uses. For example, the invention, in slightly modified form, may be used to count objects on an assembly line. The invention may also be used to detect foreign metals in a length of fibrous material such as cloth, carpeting, or the like. It may also be used in systems for opening the door of a garage or for opening and then closing the door of a garage. For the latter use, a time delay device should be used to prevent the garage door from closing until after the automobile is inside of the garage. Other similar uses will be self-evident to those skilled in the art.

What is claimed is:

1. In combination, a source of oscillations at a predetermined frequency; impedance means of the type having an impedance characteristic with respect to said source which varies as a function of the spacing between said means and an object; a phase-shifting network including said impedance means as one element thereof; phase detector means having a pair of input circuits, one including said source directly coupled to said phase detector means and the other including said source in series with said phase-shifting network, said phase detector means being initially adjusted to have a predetermined output voltage; first output circuit means connected to receive the output of said phase detector including, as one element thereof, a differentiating circuit; and second output circuit means connected to receive the output of said phase detector including a reactance tube effectively connected across said impedance means and an integrating circuit in the input circuit to said reactance tube, whereby when the impedance of said impedance means changes rapidly as, for example, when an object passes immediately adjacent said impedance means, said differentiating circuit produces an output pulse in said first output circuit means, and when there is slow drift in the impedance of said impedance means, the reactance tube coupled across said impedance means compensates for said slow drift.

2. In the combination as set forth in claim 1, said first output circuit means including an indicating device responsive to pulses.

3. In the combination as set forth in claim 1, said first output circuit means including a relay tube connected to receive the output of said differentiating circuit, and a relay having a coil in series with the plate circuit of said relay tube.

4. In the combination as set forth in claim 1, said reactance tube including a control grid and cathode, said control grid being coupled to one terminal of said impedance element and the cathode to the other terminal of said impedance element, said control grid being connected to receive the output of said intergrating circuit, and said reactance tube being one of the type in which the cathode-to-control grid impedance is a function of the gain of the tube.

5. A system for detecting the presence of an object comprising, in combination, a reactance having a variable value depending, within limits, upon the closeness of approach of an object; a phase-shifting network including said reactance as a phase-shift producing element thereof; a source of oscillations of predetermined frequency serving as the input circuit to said phase-shifting network; means for comparing the phase of the output signal of said phase-shifting network with that of the signal from said source and deriving therefrom, when an object is greater than a predetermined distance from said reactance, a control voltage of predetermined value; means coupled to said last-named means for producing an indication when there is a relatively abrupt change in said control voltage; and means coupled to said reactance and continuously responsive to relatively slow changes in said control voltage for changing the effective value of said reactance in the correct sense and amount to return said control voltage to its predetermined value.

6. A system as set forth in claim 5, wherein said means responsive to relatively slow changes in said control voltage includes a reactance tube coupled to said reactance.

7. A system as set forth in claim 5, wherein said reactance comprises a coil.

8. In combination with a phase-shift circuit including a phase-shift producing impedance element, means responsive to the phase-shift produced by said circuit for producing a control voltage having a sense and magnitude which are functions of the sense and magnitude of the change in impedance of said element from a quiescent value, means continuously responsive to relatively slow changes in said control voltage for compensating for said slow changes including an integrating circuit and a reactance tube coupled to said impedance element and responsive to the output of said integrating circuit; and means responsive to said relatively rapid changes in said control voltage for producing an indication including a differentiating circuit.

9. A vehicle detector system comprising the combination set forth in claim 8 wherein said impedance element comprises a coil adapted to be buried in a road.

References Cited in the file of this patent

UNITED STATES PATENTS

| | | | |
|---|---|---|---|
| 1,658,953 | Theremin | Feb. 14, | 1928 |
| 2,112,826 | Cook | Apr. 5, | 1938 |
| 2,247,246 | Lindsay et al. | June 24, | 1941 |
| 2,421,771 | Browning | June 10, | 1947 |
| 2,422,542 | Gustafsson | June 17, | 1947 |
| 2,428,290 | Peck | Sept. 30, | 1947 |
| 2,455,376 | Lindsay | Dec. 7, | 1948 |
| 2,488,815 | Hailes | Nov. 22, | 1949 |
| 2,492,182 | Robinson | Dec. 27, | 1949 |
| 2,708,746 | Shaw | May 17, | 1955 |
| 2,721,994 | Brown | Oct. 25, | 1955 |
| 2,749,537 | Loudon et al. | June 5, | 1956 |
| 2,767,393 | Bagno | Oct. 16, | 1956 |